US007904034B2

(12) United States Patent
Khan et al.

(10) Patent No.: US 7,904,034 B2
(45) Date of Patent: Mar. 8, 2011

(54) METHOD AND SYSTEM FOR PROVIDING AN INTERFERENCE CANCELLATION IN A WIRELESS COMMUNICATION SYSTEM

(75) Inventors: Farooq Khan, Allen, TX (US); Cornelius Van Rensburg, Dallas, TX (US); Zhouyue Pi, Richardson, TX (US); Jiann-An Tsai, Plano, TX (US); Yinong Ding, Plano, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 889 days.

(21) Appl. No.: 11/882,310

(22) Filed: Jul. 31, 2007

(65) Prior Publication Data

US 2008/0146166 A1 Jun. 19, 2008

Related U.S. Application Data

(60) Provisional application No. 60/875,490, filed on Dec. 18, 2006.

(51) Int. Cl.
*H04B 1/04* (2006.01)

(52) U.S. Cl. .................. 455/114.2; 455/278.1; 455/304; 375/296; 375/304

(58) Field of Classification Search ............... 455/114.2, 455/205–206, 272–273, 276.1, 278.1, 303, 455/304; 375/295–296, 299, 302, 304
See application file for complete search history.

(56) References Cited

U.S. PATENT DOCUMENTS 6,081,568 A * 6/2000 Oda .............................. 375/358
6,243,587 B1 * 6/2001 Dent et al. ................. 455/456.2
6,813,263 B1 * 11/2004 Margherita ................... 370/347
7,035,894 B2 * 4/2006 Park et al. ..................... 709/200
7,603,140 B2 * 10/2009 Chen et al. ................. 455/562.1
2004/0204106 A1 * 10/2004 Gurelli et al. ............. 455/562.1
2006/0072528 A1 * 4/2006 Kent et al. ...................... 370/338
2006/0264183 A1 * 11/2006 Chen et al. ..................... 455/101
2007/0142074 A1 * 6/2007 Black et al. ................... 455/522
2010/0069032 A1 * 3/2010 Kent et al. .................. 455/276.1

* cited by examiner

*Primary Examiner* — Edward Urban
*Assistant Examiner* — Christian A Hannon

(57) ABSTRACT

A system, a receiver apparatus, a transmitter apparatus and a method for inter-user interference cancellation when simultaneous transmissions from two wireless users to the same base station are repeated using the same time-frequency resource. The percentage of interference cancellation is pre-set and phase shifts of the first and repeated transmitted symbols for each mobile user are determined in accordance with this pre-set percentage. The receiver uses a pre-determined technique for estimating the received symbols in accordance with the pre-set percentage and phase shifts.

20 Claims, 10 Drawing Sheets

METHOD AND SYSTEM FOR PROVIDING AN INTERFERENCE CANCELLATION IN A WIRELESS COMMUNICATION SYSTEM

CLAIM OF PRIORITY

This application makes reference to, claims all benefits accruing under 35 U.S.C. §119 from, and incorporates herein a provisional application entitled A SIMPLE TECHNIQUE FOR INTERFERENCE CANCELLATION INA WIRELESS COMMUNICATION SYSTEM filed in the U.S. Patent & Trademark Office on 18 Dec. 2006, and there duly assigned Ser. No. 60/875,490.

BACKGROUND OF THE INVENTION

1. Field of the Invention

The present invention relates to an interference cancellation/removal system, apparatus and method which can reduce inter-user interference when simultaneous transmissions to the same base station are repeated from two or more wireless users using the same time frequency resource.

2. Description of the Related Art

In mobile communications, interfering signals that hamper reception quality can result from a number of sources.

In a wireless communication system when two users transmit simultaneously in the same cell to a base station, their transmissions can interfere with each other. When both users use the same time-frequency resource, their transmissions interfere with each other.

Moreover, if both users repeat the transmission of the same symbols in subsequent slots, the desired signals may be combined coherently by the base station, but both interference and noise will be combined non-coherently, thus causing interference.

Furthermore, if the channels for the two users do not change across repeated transmissions, both the desired signals and the interference will be combined coherently by the base station, but the noise will still be combined non-coherently. Therefore, the interference from the other signal will result in close to an one hundred percent error rate.

Accordingly, we have realized that there is a need for techniques to mitigate interference during the operation of wireless communication system.

SUMMARY OF THE INVENTION

It is therefore an object of the present invention to provide an improved transceiver and an improved method for data transmission in a wireless communication system.

It is another object to provide a transceiver and a method where repeated signals from one of two users transmitting simultaneously using the same time-frequency resource are phase shifted with the result that each user removes interference from the other user.

It is still another object to provide a transceiver and a method for data transmission that is simple, reliable, and inexpensive.

According to one aspect of the present invention, a method for controlling data transmission from a plurality of transmitters to a receiver is provided. The method contemplates determining a first through a fourth phase shift to achieve a selected percentage of interference cancellation between first and second transmitters during transmissions by the plurality of transmitters, assigning the first phase shift and the second phase shift respectively to the first transmitter and the second transmitter for corresponding simultaneous transmissions of a first signal and a second signal in a first time-frequency slot in accordance with a selected protocol, and assigning the third phase shift and the fourth phase shift respectively to the first transmitter and the second transmitter for corresponding simultaneous re-transmissions of the first and second signal in a second time-frequency slot in accordance with the selected protocol.

The first phase shift may be substantially equal to the second phase shift. The third phase shift may be different from the fourth phase shift by a selected amount to achieve the selected percentage of interference cancellation between first and second transmitters.

Moreover, the selected amount may be $\pi$ radians in order to achieve a 100% interference cancellation.

The first phase shift, the second phase shift and the third phase shift may be substantially equal to zero, and the fourth phase shift may be substantially equal to $\pi$ radians.

According to another aspect of the present invention, a method for controlling data transmission from a transmitter to a receiver via a plurality of antennas contemplates converting user data into two data streams, determining a first through a fourth phase shift to achieve a selected percentage of interference cancellation between the two data streams, assigning the first phase shift to a first data stream for transmission via a first antenna in a first time-frequency slot in accordance with a selected protocol, assigning the second phase shift to a second data stream for transmission via a second antenna in the first time-frequency slot in accordance with the selected protocol, simultaneously with said transmission of the first data stream, assigning the third phase shift to the first data stream for re-transmission via the first antenna in a second time-frequency slot in accordance with the selected protocol, and assigning the fourth phase shift to the second data stream for re-transmission via the second antenna in the second time-frequency slot simultaneously with said re-transmission of the first signal in accordance with the selected protocol.

The first phase shift may be substantially equal to the second phase shift. The third phase shift may be different from the fourth phase shift by a selected amount to achieve the selected percentage of interference cancellation between first and second transmitters.

BRIEF DESCRIPTION OF THE DRAWINGS

A more complete appreciation of this invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF EMBODIMENTS

In the following description, for purposes of explanation rather than limitation, specific details are set forth such as the particular architecture, interfaces, techniques, etc., in order to provide a thorough understanding of the present invention. However, it will be apparent to those skilled in the art that the present invention may be practiced in other embodiments, which depart from these specific details. For purposes of simplicity and clarity, detailed descriptions of well-known devices, circuits, and methods are omitted so as not to obscure the description of the present invention with unnecessary detail.

Figure 1:
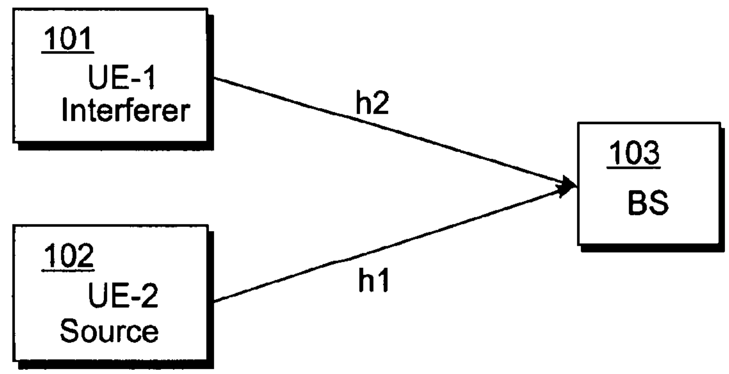
FIG. 1 illustrates an interference scenario in a wireless communication system.
Figure 2:
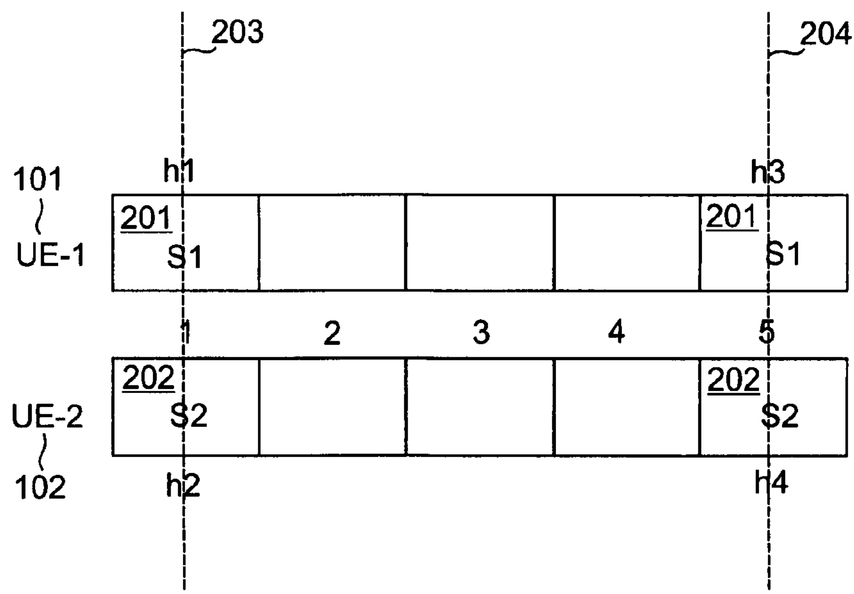
FIG. 2 is a view illustrating two users transmitting and re-transmitting simultaneously the same symbols while using the same time-frequency resource in a wireless communication system.

In a wireless communication system as illustrated in FIG. 1, when two users UE-1 101 and UE-2 102 transmit simultaneously in the same cell to a base station 103, their transmissions can interfere with each other. As illustrated in FIG. 2, assuming the two users 101 and 102 transmit symbols $S_1$ 201 and $S_2$ 202, respectively, and that both users use the same time-frequency resource, their transmissions interfere with each other in slot#1 203.

Moreover, if both users repeat the transmission of the same symbols in slot#5 204, as illustrated in FIG. 2 (where $h_1$ and $h_3$ represent channel gains between UE-1 101 and base station 103 in slot#1 and slot#5, respectively, while $h_2$ and $h_4$ represent channel gains between UE-2 102 and base station 103 in slot#1 and slot#5, respectively), the desired signals may be combined coherently by base station 103, but both the interference and noise will be combined non-coherently.

Figure 3:
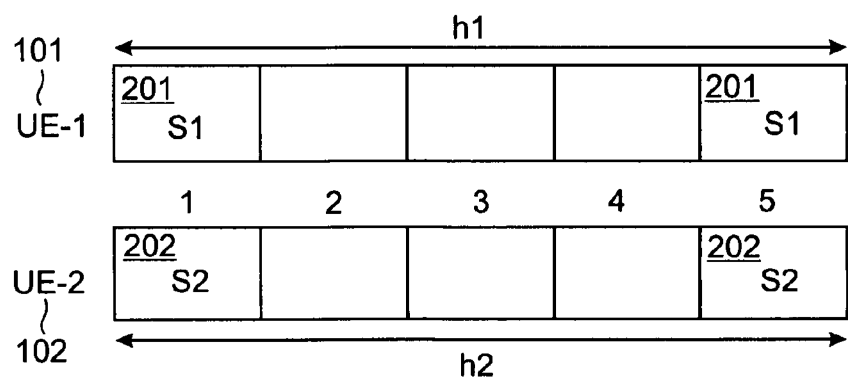
FIG. 3 is a view illustrating two users transmitting and re-transmitting simultaneously the same symbols using the same time-frequency resource while transmission channels for the two users do not change across repeated transmissions in a wireless communication system.

Furthermore, if the channels for the two users do not change across repeated transmissions, i.e., $h_1=h_3$ and $h_2=h_4$, as illustrated in FIG. 3, both the desired signals and interference will be combined coherently by base station 103, but the noise will still be combined non-coherently. Therefore, the interference from the other signal would result in close to a 100% error rate for the transmissions in slot#5.

The techniques described herein for cancelling interference may be used in various wireless communication systems, such as Code Division Multiple Access (CDMA) systems including IS-95, CDMA 2000, Wideband Code Division Multiple Access (W-CDMA), some other CDMA standards, or a combination thereof, Personal Communication Services (PCS) systems. These standards are known in the art and therefore the description of these standards need not be repeated here.

Figure 4:
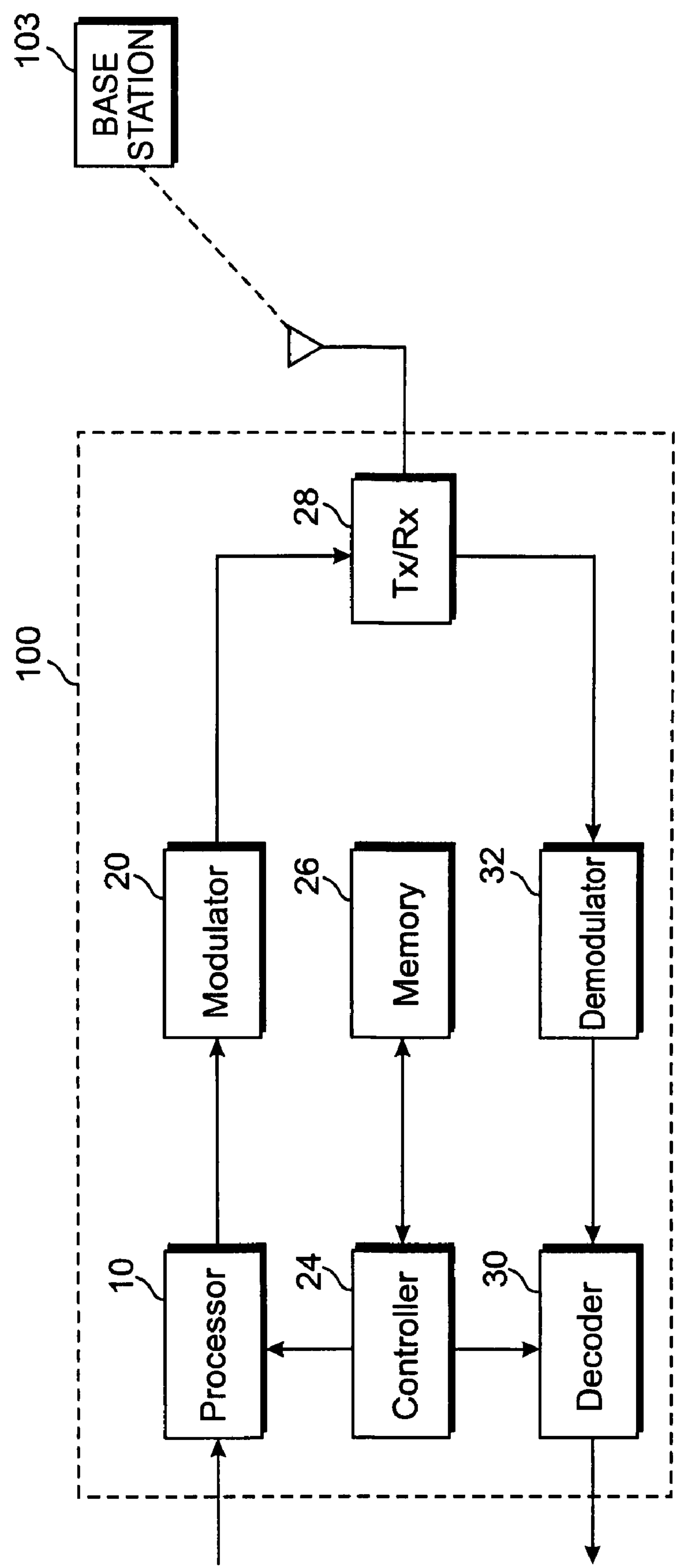
FIG. 4 illustrates a mobile system in communication with a base station in a wireless communication system.

FIG. 4 depicts a representative hardware of a mobile system 100 in communication with a base station 103 of a wireless (e.g., MIMO-OFDM) communication system. Note that mobile system 100 within the context of this disclosure contemplates a mobile phone and other mobile devices, such as a personal digital assistant (PDA), a personal communication assistant (PCA), and an electronic organizer, or any duplex interactive devices. As shown in FIG. 4, a mobile system 100 includes a data processor 10, a modulator 20, a controller 24, a memory 26, a transceiver 28, a decoder 30, and a demodulator 32.

When mobile system 100 is in transmission mode, processor 10 codes and interleaves the data based on one or more coding schemes to provide coded data in compliance with the instructions of controller 24. Here, the data rate and coding scheme may be determined by controller 24. The coded data is then provided to modulator 20 to modulate using one or more modulation schemes in compliance with the instructions of controller 24. The modulated signals from transceiver 28 is transmitted via antenna to base station 103. Note that these modulation schemes may include various methods that are well known to those skilled in this art, e.g., multi-tone phase-shift keying (M-PSK), multi-tone quadrature amplitude modulation (M-QAM), and so on, and data may be multiplexed using time-division multiplexing (TDM), frequency-division multiplexing (FDM) or code division multiplexing (CDM) in all or a subset of the frequency subchannels and in all or a subset of the spatial subchannels used to transmit the data.

When mobile system 100 is in reception mode, the transmitted modulated signals are received by transceiver 28 via antenna. Demodulator 32 demodulates data from transceiver 28, and then decoder 30 decodes the demodulated data in compliance with the directions of controller 24. Controller 24 direct the operation of the transmission and reception modes, and memory 26 provides storage for program codes and data used by controller 24. Here, software codes may be stored in memory 26 and executed by controller 24. Memory 26 may be implemented within controller 24, in which case it can be communicatively coupled to controller 24 via various means as is known in the art.

It should be further noted that coding and decoding techniques may be implemented by various means, e.g. hardware, software, or a combination thereof, such as specific integrated circuits (ASICs), digital signal processors (DPSs), digital signal processing devices (DSPDs), programmable logic devices (PLDs), field programmable gate arrays (FP-GAs), micro-controllers, microprocessors, and other electronic units designed to perform the function described herein, or a combination thereof.

Figure 5:
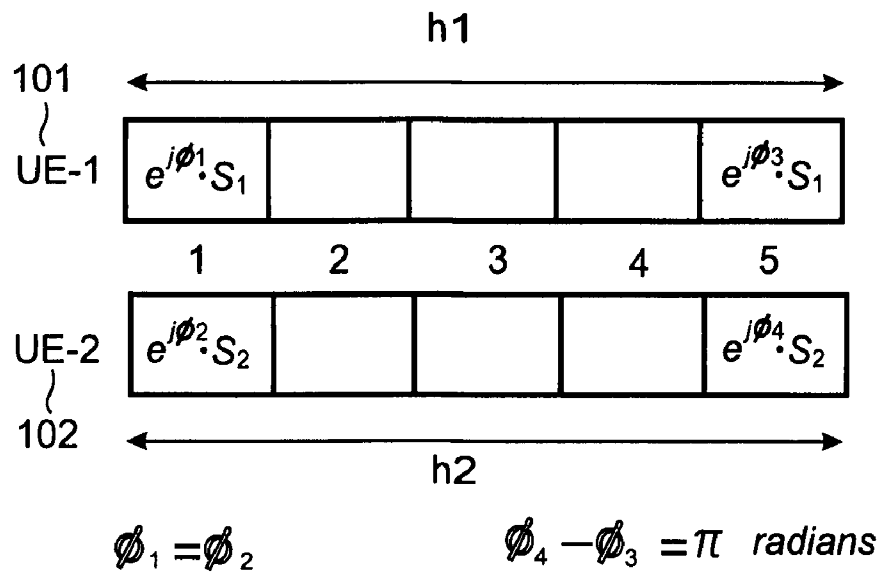
FIG. 5 is a view illustrating two users transmitting repeated signals simultaneously using the same time-frequency resource according to a first embodiment of the principles of the present invention.

Referring to FIG. 5, according to a first embodiment of the present invention, repeated signals from one of two mobile users transmitting simultaneously using the same time-frequency resource are phase shifted by π radians relative to the other user. In FIG. 5, UE-1 101 and UE-2 102 transmit symbols $S_1$ and $S_2$, respectively, with phase shifts of $\Phi_1$ and $\Phi_2$ radians in slot#1. In slot#5, UE-1 101 retransmits $S_1$ with $\Phi_3$ phase shift while UE-2 102 retransmits $S_2$ with $\Phi_4$ phase shift. Here, it is assumed that the channel for the two users does not change across repeated transmissions, i.e., $h_1=h_3$ and $h_2=h_4$.

After the transmission, base station 103 performs equalization on the received signals and combines the two received signals $r_1$ and $r_2$ at slot#1 and slot#5, respectively, to recover the signals for each of UEs 101 and 102. The signal for UE-1 101 is recovered by Equation (1) as follows:

$$\begin{aligned}\hat{s}_1 &= h_1^*(e^{-j\phi_1}\cdot r_1 + e^{-j\phi_3}r_2) \\ &= h_1^*e^{-j\phi_1}\cdot(h_1s_1e^{+j\phi_1} + h_2s_2e^{+j\phi_2} + n_1) + \\ &\quad h_1^*e^{-j\phi_3}\cdot(h_1s_1e^{+j\phi_3} + h_2s_2e^{+j\phi_4} + n_2) \\ &= |h_1|^2s_1 + h_1^*h_2s_2e^{j(\phi_2-\phi_1)} + h_1^*e^{-j\phi_1}n_1 + \\ &\quad |h_1|^2s_1 + h_1^*h_2s_2e^{j(\phi_4-\phi_3)} + e^{-j\phi_3}\cdot h_1^*n_2\end{aligned} \tag{1}$$

In accordance with the first embodiment of the present invention, the first transmission happens with the same phase shift for the two users while the repeated symbols from the two users are transmitted out of phase, i.e., $\Phi_1=\Phi_2$ and $\Phi_4-\Phi_3=\pi$ radians and therefore the estimated symbol for UE-1 101 is given by Equation (2) as follows:

$$\begin{aligned}\hat{s}_1 &= |h_1|^2s_1 + h_1^*h_2s_2e^{j(\phi_2-\phi_1)} + h_1^*e^{-j\phi_1}\cdot n_1 + \\ &\quad |h_1|^2s_1 + h_1^*h_2s_2e^{j(\phi_4-\phi_3)} + h_1^*e^{-j\phi_3}\cdot n_2 \\ &= |h_1|^2s_1 + h_1^*h_2s_2 + e^{-j\phi_1}\cdot h_1^*n_1 + |h_1|^2s_1 - \\ &\quad h_1^*h_2s_2 + h_1^*e^{-j\phi_3}\cdot n_2 \\ &= 2\cdot(|h_1|^2s_1) + h_1^*e^{-j\phi_1}\cdot n_1 + h_1^*e^{-j\phi_3}\cdot n_2\end{aligned} \tag{2}$$

The transmitted signal for UE-1 is estimated by adding the two received signals across two transmission attempts, as shown above in (1).

Similarly, the transmitted symbol for UE-2 102 is estimated by Equation (3) follows:

$$\begin{aligned}\hat{s}_2 &= h_2^*(e^{-j\phi_2}\cdot r_1 + e^{-j\phi_4}r_2) \\ &= 2\cdot(|h_2|^2s_2) + h_2^*e^{-j\phi_2}\cdot n_1 + h_2^*e^{-j\phi_4}\cdot n_2\end{aligned} \tag{3}$$

The transmitted signal for UE-2 is estimated by adding the signal received at the second transmission ($r_2$) attempt from the signal received at the first transmission ($r_1$) attempt as shown above in (3).

Accordingly, in the first embodiment of the method of the present invention it can be seen that each user completely removes interference from the other user. Hence, inter-user interference is completely cancelled when the transmission from the two users are repeated. The only source of degradation is the background additive white Gaussian noise (AWGN) noise.

Figure 6:
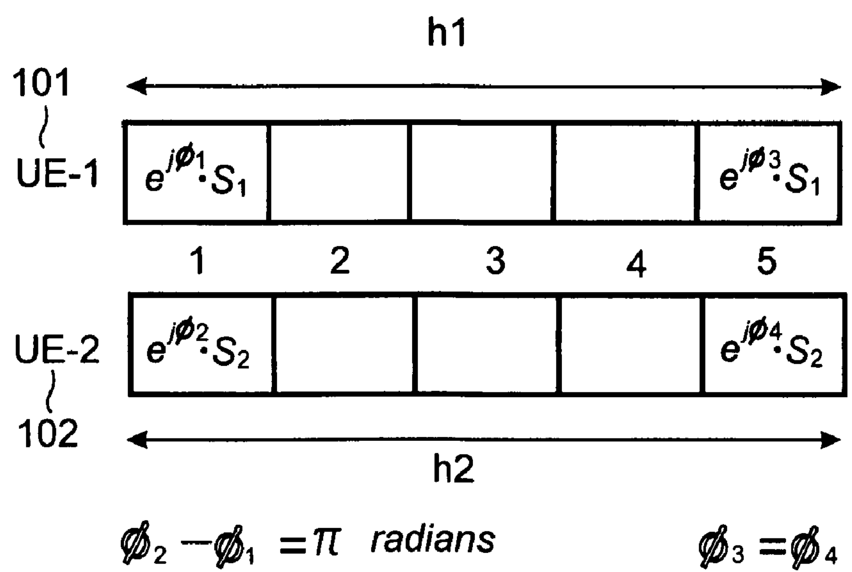
FIG. 6 is a view illustrating two users transmitting repeated signals simultaneously using the same time-frequency resource wherein said first time transmission of the symbols from the two users are π radians out of phase and the repeated symbols are in phase according to a second embodiment of the principles of the present invention.

Referring to FIG. 6, according to a second embodiment of the current invention, the first time transmissions of the symbols from the two users are π radians out of phase while the repeated symbols are in phase, i.e., $\Phi_3=\Phi_4$ and $\Phi_2-\Phi_1=\pi$ radians Similar to the analysis of the first embodiment where the phase shift was made in the repeated symbols, a complete cancellation/removal of interference may be achieved.

Figure 7:
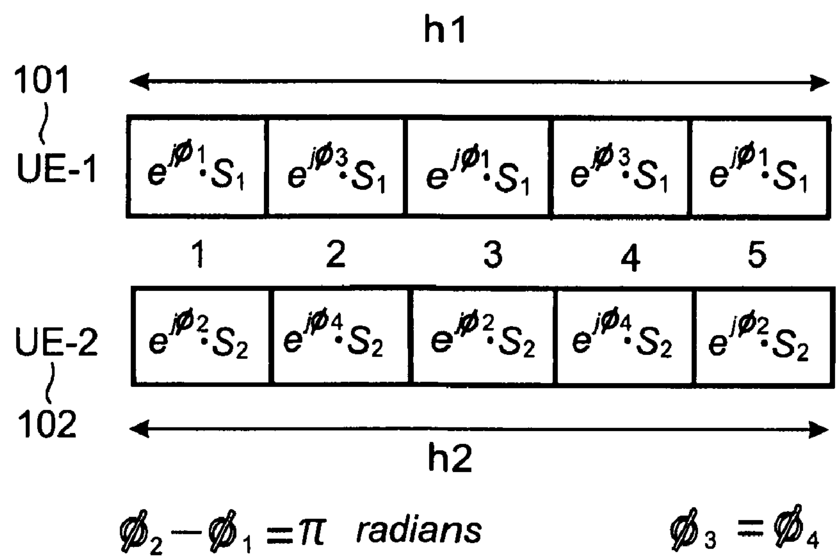
FIG. 7 is a view illustrating two users transmit repeating signals for multiple times wherein the first transmission and odd repetitions thereof are π radians out of phase and the odd repeated symbols are in phase according to a third embodiment of the principles of the present invention.

Referring to FIG. 7, according to a third embodiment of the present invention, the symbols from both users are repeated multiple times. In FIG. 7, the first transmission in slot#1 and repetitions in slot#3 and slot#5 for the two users are π radians out of phase while the repeated symbols in slot#2 and slot#4 for the two users are in phase. As a result, the cross-user interference is completely eliminated after an even number of repetitions according to the method of the present invention illustrated in FIG. 7.

Figure 8:
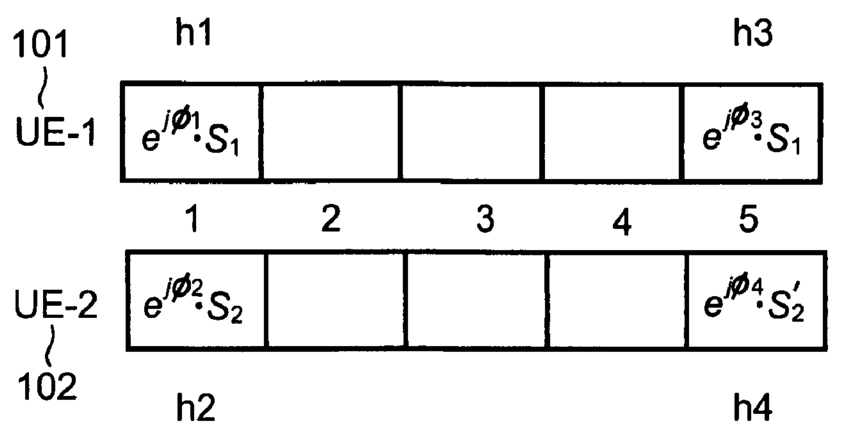
FIG. 8 is a view illustrating a change of channel at the time of symbol repetition according to a fourth embodiment of the principles of the present invention.

Referring to FIG. 8, according to a fourth embodiment of the present invention, the channel changes at the time of symbol repetition. For example, suppose UE-2 scales $s_2$ before repetition at slot#5 by Equation (4) as follows:

$$S_2' = \frac{h_1^*\cdot h_2}{h_3^*\cdot h_4}\cdot S_2 \tag{4}$$

In this case, the signal for UE-1 is recovered by Equation (5) as follows:

$$\begin{aligned}\hat{s}_1 &= h_1^*e^{-j\phi_1}\cdot r_1 + h_3^*e^{-j\phi_3}r_2 \\ &= h_1^*e^{-j\phi_1}\cdot(h_1s_1e^{+j\phi_1} + h_2s_2e^{+j\phi_2} + n_1) + \\ &\quad h_3^*e^{-j\phi_3}\cdot(h_3s_1e^{+j\phi_3} + h_4s_2'e^{+j\phi_4} + n_2) \\ &= |h_1|^2s_1 + h_1^*h_2s_2e^{j(\phi_2-\phi_1)} + h_1^*e^{-j\phi_1}n_1 + \\ &\quad |h_3|^2s_1 + h_3^*h_4s_2'e^{j(\phi_4-\phi_3)} + e^{-j\phi_3}\cdot h_3^*n_2\end{aligned} \tag{5}$$

Here, the first transmission happens with the same phase shift for the two users while the repeated symbols from the two users are transmitted out of phase, that is $\Phi_1=\Phi_2$ and $\Phi_4-\Phi_3=\pi$ radians Therefore, the estimated symbol for UE-1 is given as by Equation (6) as follows:

$$\begin{aligned}\hat{s}_1 &= |h_1|^2s_1 + h_1^*h_2s_2e^{j(\phi_2-\phi_1)} + h_1^*e^{-j\phi_1}\cdot n_1 + \\ &\quad |h_3|^2s_1 + h_3^*h_4s_2'e^{j(\phi_4-\phi_3)} + h_3^*e^{-j\phi_3}\cdot n_2 \\ &= |h_1|^2s_1 + h_1^*h_2s_2 + e^{-j\phi_1}\cdot h_1^*n_1 + |h_1|^2s_1 - \\ &\quad h_3^*h_4s_2' + h_3^*e^{-j\phi_3}\cdot n_2\end{aligned} \tag{6}$$

It can be seen that substituting (4) into (6) will completely eliminate interference from UE-2 as shown below in Equation (7):

$$\begin{aligned}\hat{s}_1 &= |h_1|^2 s_1 + h_1^* h_2 s_2 e^{j(\phi_2-\phi_1)} h_1^* e^{-j\phi_1} \cdot n_1 + |h_3|^2 s_1 + \\ &\quad h_3^* h_4 s_2' e^{j(\phi_4-\phi_3)} + h_3^* e^{-j\phi_3} \cdot n_2 \\ &= |h_1|^2 s_1 + h_1^* h_2 s_2 + e^{-j\phi_1} \cdot h_1^* n_1 + |h_3|^2 s_1 - h_3^* h_4 \cdot \\ &\quad \frac{h_1^* \cdot h_2}{h_3^* \cdot h_4} s_2 + h_3^* e^{-j\phi_3} \cdot n_2 \\ &= |h_1|^2 s_1 + |h_3|^2 s_1 + h_1^* e^{-j\phi_1} \cdot n_1 + h_3^* e^{-j\phi_3} \cdot n_2\end{aligned} \tag{7}$$

Figure 9:
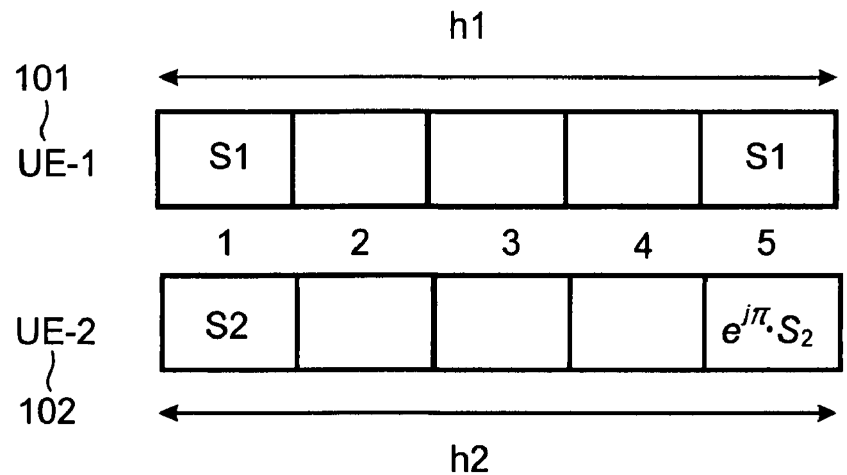
FIG. 9 is a view illustrating two users transmitting simultaneously using the same time-frequency resource with the second user repeating symbols phase shifted by π radians according to a fifth embodiment of the principles of the present invention.

Referring to FIG. 9, according to a fifth embodiment of the present invention, two users are transmitting repeating symbols $S_1$ and $S_2$ respectively and simultaneously using the same time-frequency resource, with UE-2's repeated symbols being phase shifted by π radians. This allows complete elimination inter-user interference. In FIG. 9, UE-1 101 and UE-2 102 transmit symbols $S_1$ and $S_2$, respectively, in slot#1, while in slot#5 UE-1 101 retransmits $S_1$ as it is while UE-2 102 transmits $-S_2$. The symbol $-S_2$ is obtained by applying a phase shift of π radians to $S_2$. Further, it is assumed that the channel gain for the two users does not change across repeated transmissions, that is $h_1=h_3$ and $h_2=h_4$ Base station 103 performs equalization on the received signals and combines the two received signals ($r_1$ and $r_2$) to recover the data signals received from each of the UEs 101, 102. Since UE-1 101 just repeats its symbol as it is, the transmitted signal for UE-1 101 is estimated by just adding the two received signals across two transmission attempts as shown below in Equation (8):

$$\begin{aligned}\hat{s}_1 &= h_1^*(r_1 + r_2) \\ &= h_1^*(h_1 s_1 + h_2 s_2 + n_1) + h_1^*(h_1 s_1 - h_2 s_2 + n_1) \\ &= |h_1|^2 s_1 + h_1^* h_2 s_2 + h_1^* n_1 + |h_1|^* s_1 - h_1^* h_2 s_2 + h_1^* n_2 \\ &= 2 \cdot (|h_1|^2 s_1) + h_1^* n_1 + h_1^* n_2\end{aligned} \tag{8}$$

On the other hand, since UE-2 102 repeats the transmission of its signal with a phase shift of π radians, its received signal is estimated by subtracting the signal at the second transmission ($r_2$) attempt from the signal received at the first transmission ($r_1$) as shown below in Equation (9):

$$\begin{aligned}\hat{s}_2 &= h_2^*(r_1 - r_2) \\ &= h_2^*(h_1 s_1 + h_2 s_2 + n_1) - h_2^*(h_1 s_1 - h_2 s_2 + n_2) \\ &= |h_2|^2 s_2 + h_2^* h_1 s_1 + h_2^* n_1 + |h_2|^2 s_2 - h_2^* h_1 s_2 - h_2^* n_2 \\ &= 2 \cdot (|h_2|^2 s_2) + h_2^* n_1 - h_2^* n_2\end{aligned} \tag{9}$$

It can be seen that both users completely eliminate the interference from each other. The only source of degradation is the background AWGN noise.

Figure 10:
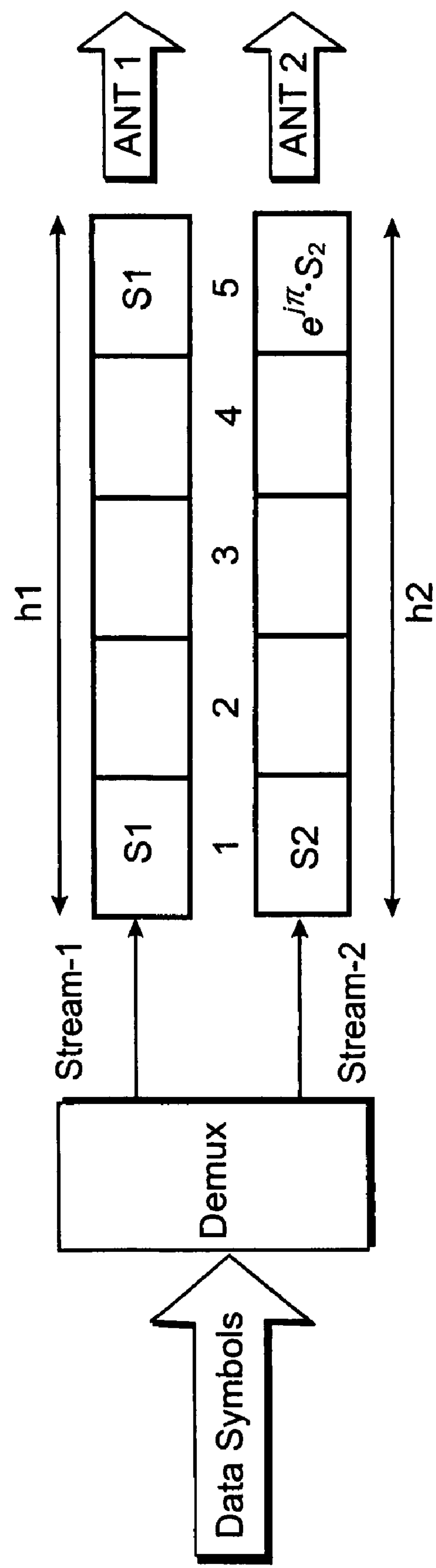
FIG. 10 is a view illustrating a sixth embodiment according to the principles of the present invention for cancellation of interference for multiple data streams transmitted to the same user.

Referring to the MIMO system of FIG. 10, according to a sixth embodiment, the interference cancellation principle of the present invention is applied to cancel interference for multiple data streams transmitted to the same user via different respective data streams. Stream-1 repeats its signal $S_1$ at slot 5 while Stream-2 repeats its signal out of phase as $e^{j\pi}S_2$ at slot 5 (e.g., phase shifted by π radians). It should be noted that when Stream-2 retransmits (i.e., repeats) its signal phase shifted by π radians, Stream-1 and Stream-2 completely remove interference from each other. Inter-stream interference is completely cancelled when the transmission from the two streams are repeated. The only significant source of degradation is the background AWGN noise. The percentage of interference cancellation depends on the amount of phase shift applied. Since Stream-1 just repeats its symbol $S_1$ as it is, the transmitted signal for Stream-1 is estimated by just adding the two received signals $r_1$ and $r_2$ across two transmission attempts. And, since Stream-2 just repeats its signal $S_2$ with, e.g., π radians of phase shift, its received signal is estimated by subtracting the signal $r_2$ received at the second transmission attempt from the signal $r_1$ received at the first transmission attempt.

Figure 11:
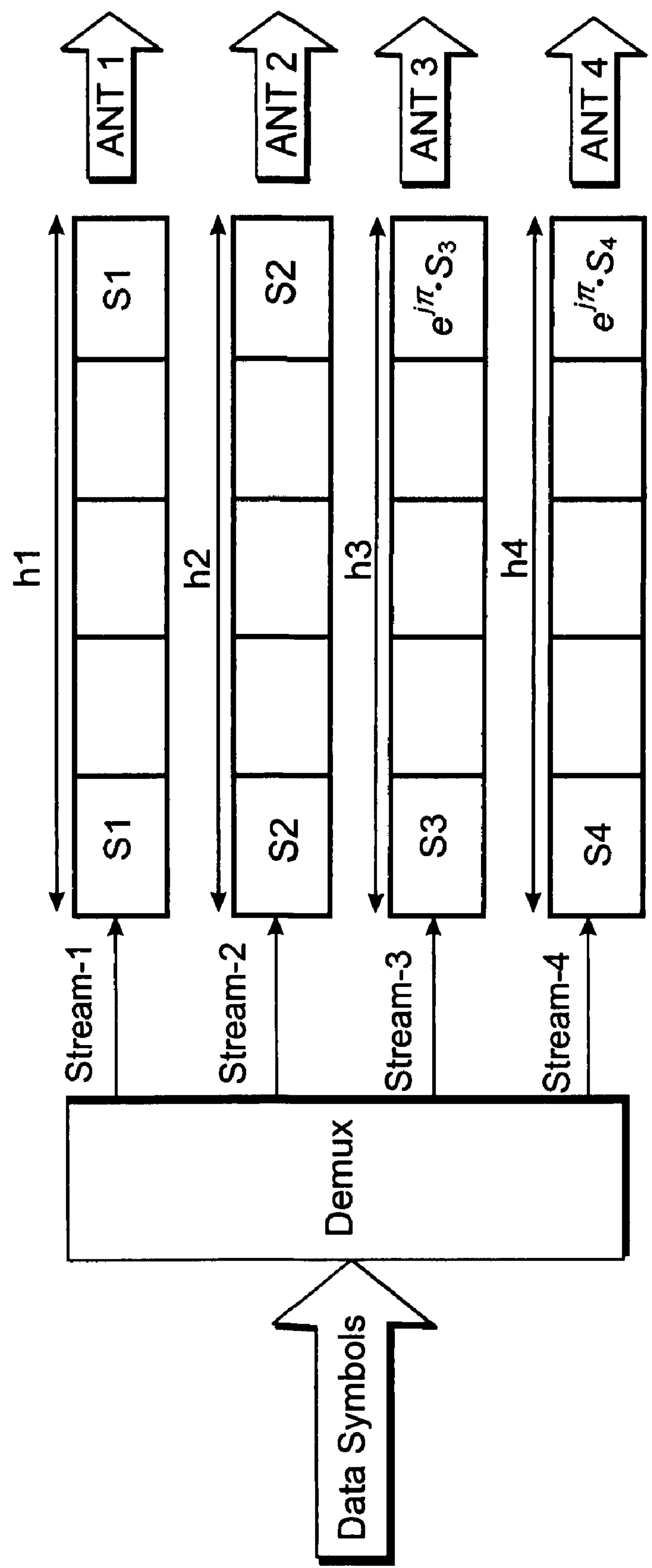
FIG. 11 is a view illustrating a seventh embodiment according to the principles of the present invention for the cancellation of interference for four data streams transmitted to the same user.

Referring to FIG. 11, according to a seventh embodiment, the interference cancellation principle of the present invention is applied to cancel interference for four data streams transmitted to the same user. In this example of the seventh embodiment, symbols from stream-3 and stream-4, $S_3$ and $S_4$ respectively, are phase shifted by π radians when transmission of the symbols is repeated. The signal for data stream-1 is estimated as shown below in Equation (10):

$$\begin{aligned}\hat{s}_1 &= h_1^*(r_1 + r_2) \\ &= h_1^*(h_1 s_1 + h_2 s_2 + h_3 s_3 + h_4 s_4 + n_1) + \\ &\quad h_1^*(h_1 s_1 + h_2 s_2 - h_3 s_3 - h_4 s_4 + n_1) \\ &= |h_1|^2 s_1 + h_1^* h_2 s_2 + h_1^* h_3 s_3 + h_1^* h_4 s_4 + h_1^* n_1 + |h_1|^2 s_1 + \\ &\quad h_1^* h_2 s_2 - h_1^* h_3 s_3 - h_1^* h_4 s_4 + h_1^* n_2 \\ &= 2(|h_1|^2 s_1) + 2h_1^* h_2 s_2 + h_1^* n_1 + h_1^* n_2\end{aligned} \tag{10}$$

The signal for data stream-2 is estimated as shown below in Equation (11):

$$\hat{s}_2{}^* = h_2{}^*(r_1+r_2) = 2(h_2|^2|s_2) + 2h_2{}^*h_1s_1 + h_2{}^*n_1 + h_2{}^*n_2 \tag{11}$$

Here, stream-1 and stream-2 receive interference from each other while completely removing interference from stream-3 and stream-4. Since the signal for stream-3 and stream-4 is repeated with a phase shift of π radians, the received signals for stream-3 and stream-4 are estimated as shown below in Equation (12):

$$\hat{s}_3 = h_3{}^*(r_1r_2) = 2(|h_3{}^*s_3) + 2h_3{}^*h_4s_4 + h_3{}^*n_1 - h_3{}^*n_2 \tag{12}$$

$$\hat{s}_4 = h_4{}^*(r_1-r_2) = 2(|h_4|s_4) + 2h_4{}^*h_3s_3 + h_4{}^*n_1h_4{}^*\mathrm{n}_2$$

Figure 12:
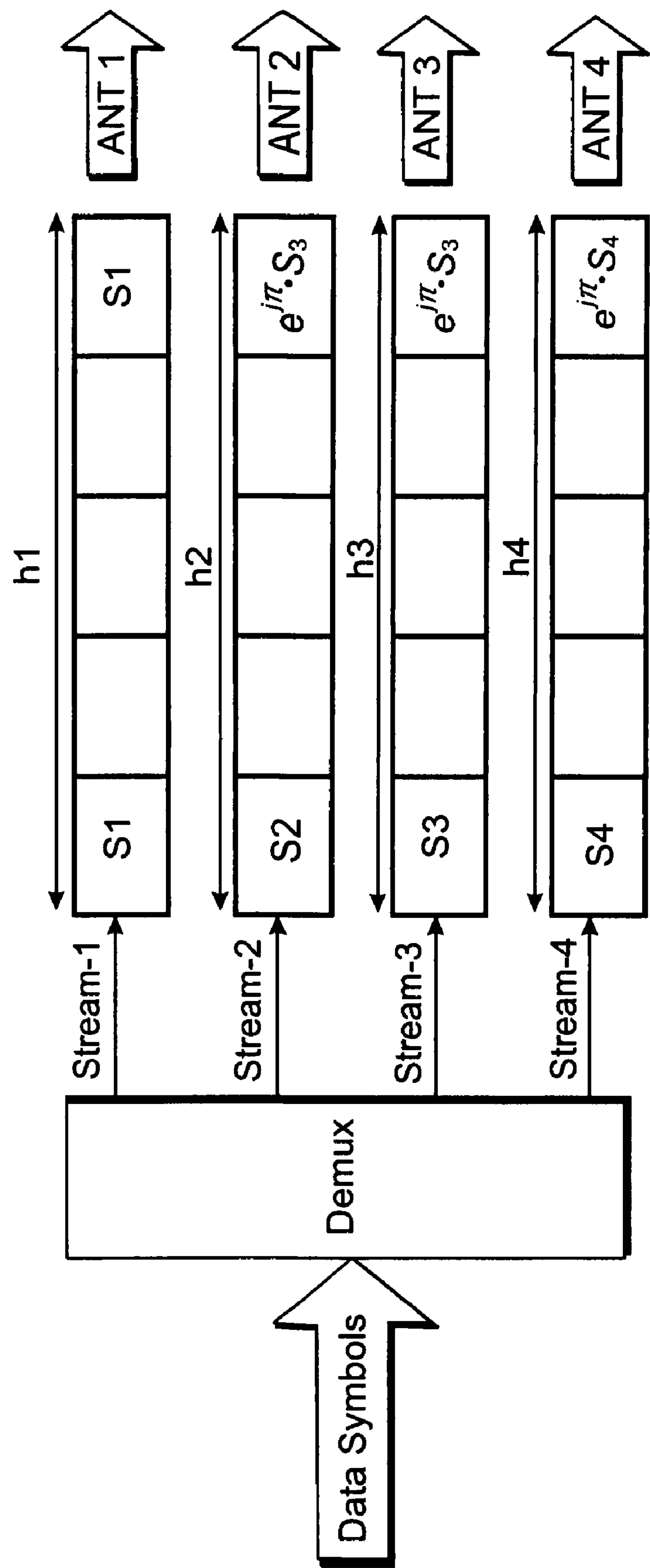
FIG. 12 is a view illustrating an eighth embodiment according to the principles of the present invention for the cancellation of interference when a first data stream is the dominant source of interference to each of a second through fourth data stream.

Referring to FIG. 12, according to an eighth embodiment of the present invention, the transmission of signals for stream-2, stream-3 and stream-4 are repeated with a phase shift of π radians. In this embodiment, stream-1 completely removes interference from stream-2, stream-3 and stream-4. The stream-2, stream-3, and stream-4 receive interference from each other, while completely removing interference from stream-1 as can be seen from Equation (13) below:

$$\hat{s}_1 = h_1{}^*(r_1+r_2) = 2\cdot(|h_1|^2s_1) + \mathrm{h}_1{}^*n_1h_1{}^*n_2$$

$$\hat{s}_2 = h_2{}^*(r_1-r_2) = 2\cdot(|h_2|^2s_2) + 2h_2{}^*h_3s_3 + 2h_2{}^*h_4s_4 + h_2{}^*n_1 - h_2{}^*n_2 \tag{13}$$

$$\hat{s}_3 = h_3{}^*(r_1-r_2) = 2\cdot(|h_3|^2s_2) + 2h_3{}^*h_2s_2 + 2h_2{}^*h_4s_4 + h_3{}^*n_1 - h_3{}^*n_2$$

$$\hat{s}_4 = h_4{}^*(r_1-r_2) = 2\cdot(|h_4|^2s_4) + 2h_4{}^*h_2s_2 + 2h_4{}^*h_3s_3 + h_4{}^*n_1 - h_4{}^*n_2$$

This eighth embodiment is a good approach if the transmission of stream-1 is the dominant interferer to streams-2 through 4.

Figure 13:
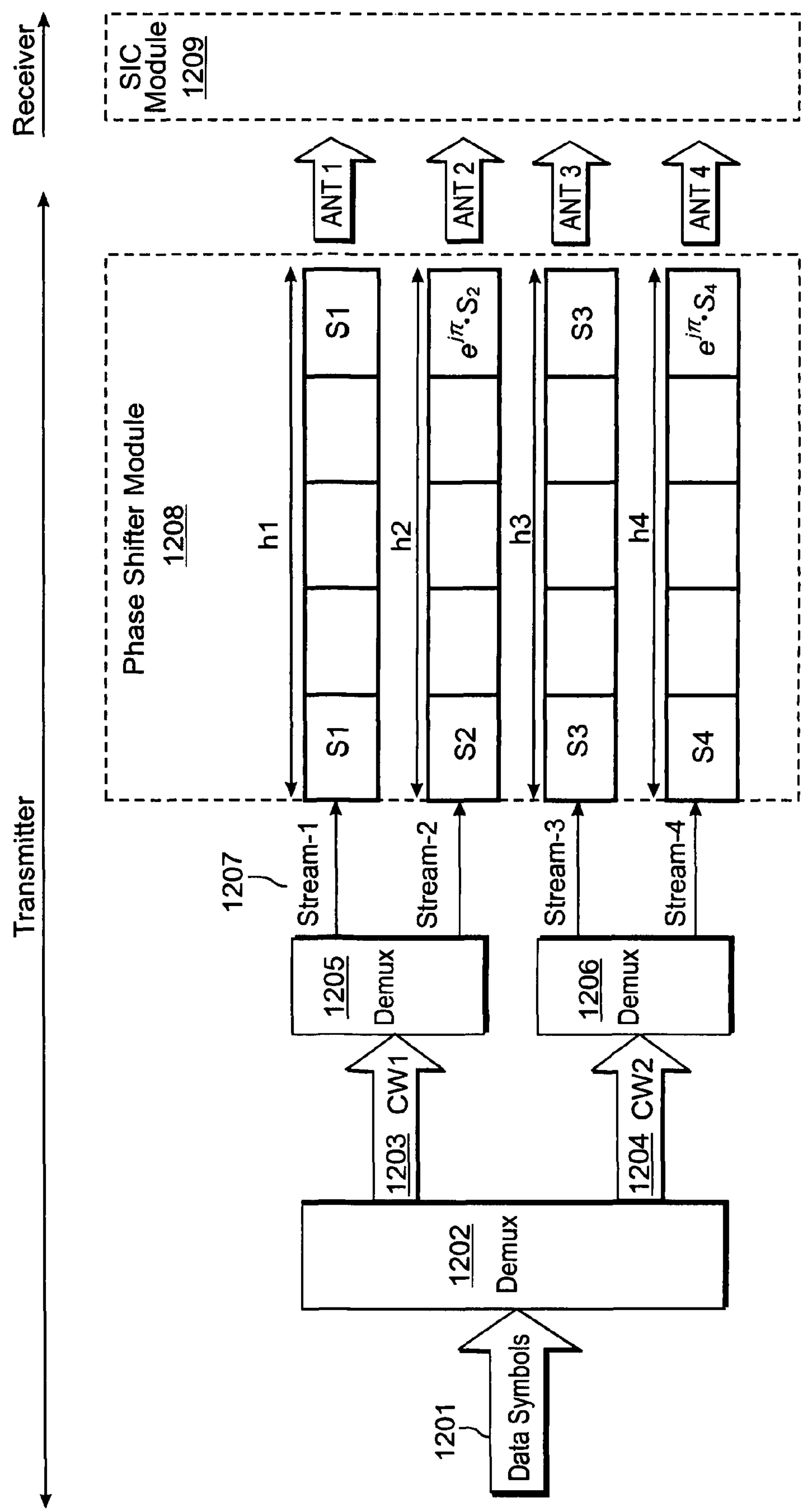
FIG. 13 is a view illustrating a ninth embodiment according to the cancellation principle of the present invention to a 4-stream MIMO system.

Referring to FIG. 13, according to a ninth embodiment of the present invention, the data symbols are first de-multiplexed 1202 into two data blocks 1203 and 1204, and the two data blocks are coded using codewords CW1 and CW2, respectively. Subsequently, each coded data blocks is further de-multiplexed by demultiplexers 1205, 1206 into two streams for a total of 4-stream 1207 MIMO transmission via different respective antennas ANT1, ANT2, ANT3 and ANT4. In this embodiment, the signals for stream-2 and stream-4 are repeated and phase shifted using phase shift module 1208 with a phase shift of π radians via their different corresponding antennas ANT2, ANT 4, as $e^{j\pi}\cdot S_2$ and $e^{j\pi}\cdot S_4$, respectively, while streams 1 and 3 repeat transmission of their corresponding symbols $S_1$, $S_3$ via different corresponding antennas ANT1 and ANT3. Therefore, stream-1 experiences interference only from stream-3. However, successive interference cancellation can be used between data blocks 1203 and 1204. This eliminates the interference from stream-3 to stream-4 and results in a completely interference-free stream-1. Similar processing on other streams by using the interference cancellation method of the present invention and use of successive interference cancellation (SIC) module 1209 results in completely interference-free stream-2 to stream-4.

The foregoing method also can be used in a MU-MIMO system where each user receives one codeword so that it is possible to get some interference cancellation gains where conventional post decoding SIC has heretofore failed.

Figure 14:
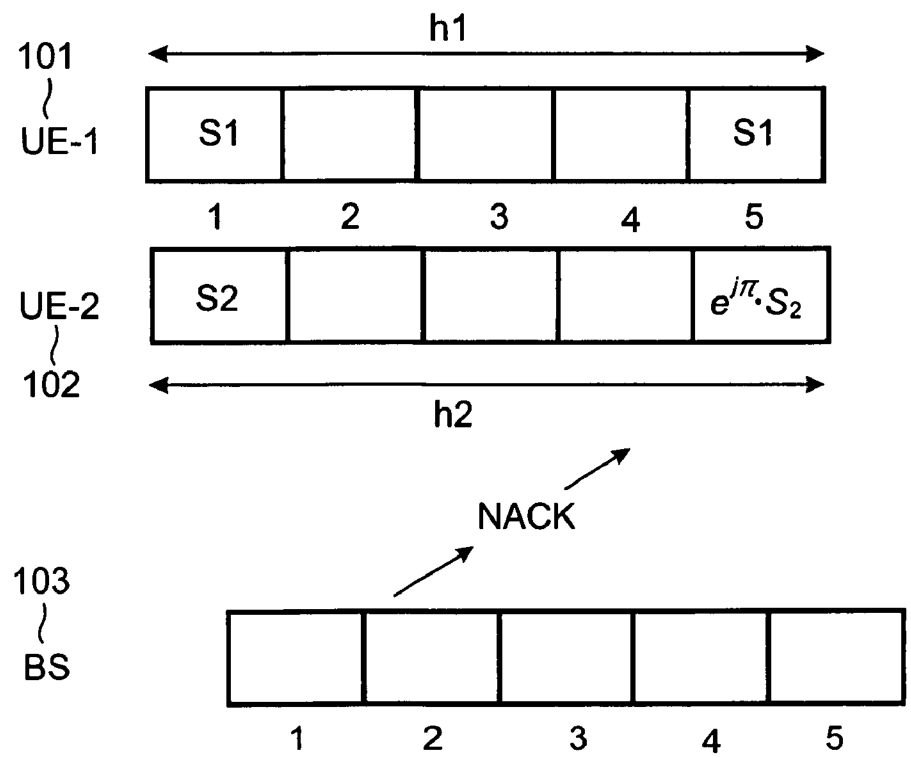
FIG. 14 is a view illustrating a tenth embodiment according to the cancellation principle of the present invention when the base station sends a hybrid ARQ NACK signal after failure to decode signals from both a first and second user.

Referring to FIG. 14, according to a tenth embodiment of the principles of the present invention, the symbols are repeated after receiving a hybrid Automatic Repeat-reQuest (ARQ) negative-acknowledgement (NACK) signal. In this embodiment of the principles of the present invention, base station 103 sends a NACK signal after receiving signals $S_1$ and $S_2$ from UE-1 101 and UE-2 102, respectively, when successful decoding of both signals fails. After receiving the NACK signal, UE-1 101 repeats its signal $S_1$ as it is while UE-2 102 applies a phase shift of n radians on its signal $S_2$ before retransmission of that signal as $e^{j\pi}\cdot S_2$.

In the present invention, repeated signals from one of the two data streams (data stream 1 or data stream 2) being transmitted simultaneously using the same time-frequency resource are phase shifted by a selected number of radians relative to the other stream.

Figure 15A:
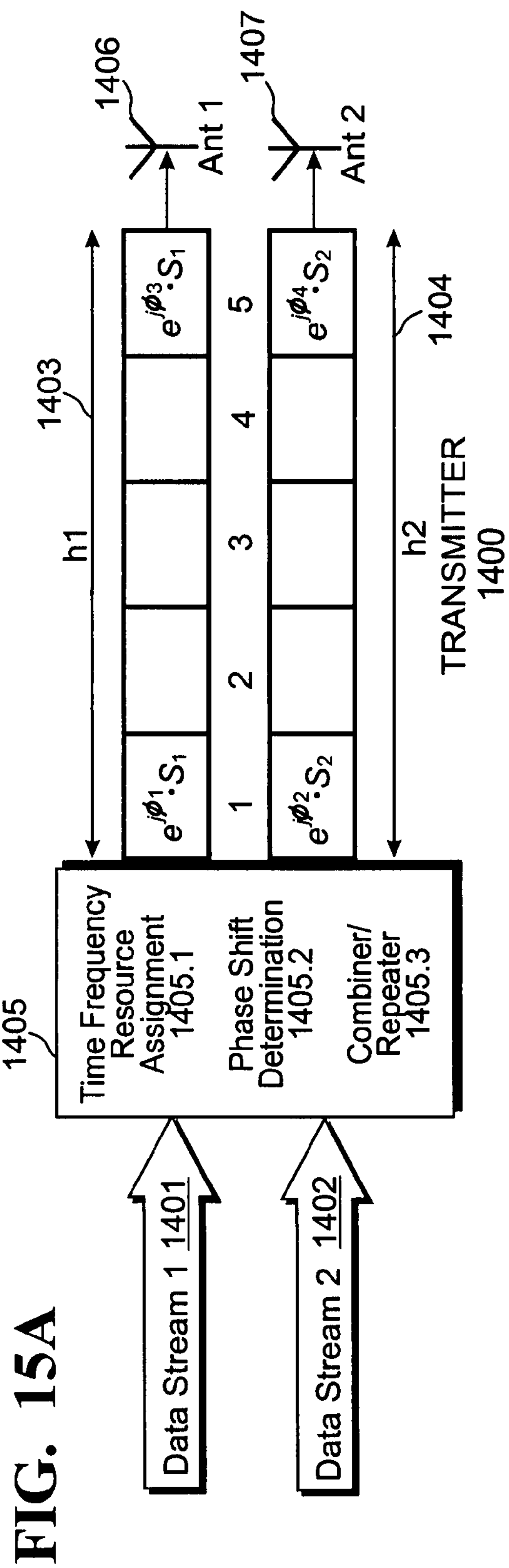
FIG. 15A illustrates a transmitter constructed according to the principles of the present invention.

In FIG. 15A, transmitter 1400 is constructed so that symbols $S_1$ and $S_2$ are transmitted respectively with phase shifts of $\Phi_1$ and $\Phi_2$ radians in slot#1. Subsequently, in slot#5, $S_1$ is retransmitted with $\Phi_3$ phase shift while $s_2$ is retransmitted with phase shift $\Phi_4$. It is assumed that the channel for the two data streams does not change across repeated transmissions. As illustrated in FIG. 15A, component 1405 processes the two data streams in order that the two data streams are transmitted simultaneously. Component 1405 includes modules 1405.1, 1405.2 and 1405.3 according to this particular implementation of the principles of the present invention. Time frequency resource assignment module 1405.1 assigns the same time-frequency resource to the two data streams to be transmitted. Phase shift determination module 1405.2 assigns phase shifts $\Phi_1$ through $\Phi_4$ to achieve a pre-determined percentage of interference cancellation/removal. Combiner/Repeater module 1405.3 combines and repeats the transmission of the symbols $S_1$ and $S_2$.

Figure 15B:
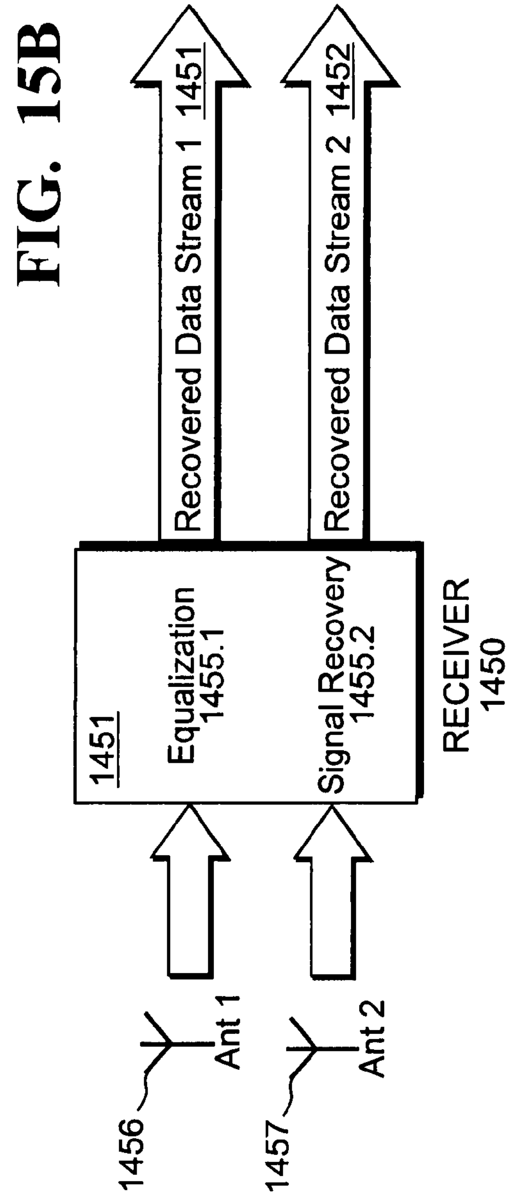
FIG. 15B illustrates a receiver constructed according to the principles of the present invention.

Receiver 1450 illustrated in FIG. 15B, performs equalization on the two streams (r1 and r2) received via antennas 1456 and 1457 by equalization module 1455.1 and signal recovery module 1455.2 combines the two received streams (r1 and r2) in order to recover the signals for each of the streams. The recovered data stream 1451 for stream-1 1401 is as below:

$$\begin{aligned}\hat{s}_1 &= h_1^*(e^{-j\phi_1}\cdot r_1 + e^{-j\phi_3}r_2)\\ &= h_1^*e^{-j\phi_1}\cdot(h_1s_1e^{+j\phi_1} + h_2s_2e^{+j\phi_2} + n_1) + h_1^*e^{-j\phi_3}\cdot\\ &\quad (h_1s_1e^{+j\phi_3} + h_2s_2e^{+j\phi_4} + n_2)\\ &= |h_1|^2s_1 + h_1^*h_2s_2e^{j(\phi_2-\phi_1)} + h_1^*e^{-j\phi_1}n_1 +\\ &\quad |h_1|^2s_1 + h_1^*h_2s_2e^{j(\phi_4-\phi_3)} + e^{-j\phi_3}\cdot h_1^*n_2\end{aligned}$$

According to the principles of the current invention, the first transmission occurs with the same phase shift for the two data streams 1401 and 1402 while the repeated symbols from the two streams are transmitted out of phase, that is, $\Phi_1=\Phi_2$ and $\Phi_4-\Phi_3$=a number of radians required to achieve a selected percentage of inter-stream interference cancellation/removal.

Therefore, when $\Phi_4\Phi_3=\pi$ radians, the estimated symbol for stream-1 is given as:

$$\begin{aligned}\hat{s}_1 &= |h_1|^2s_1 + h_1^*h_2s_2e^{j(\phi_2-\phi_1)} + h_1^*e^{-j\phi_1}\cdot n_1 +\\ &\quad |h_1|^2s_1 + h_1^*h_2s_2e^{j(\phi_4-\phi_3)} + h_1^*e^{-j\phi_3}\cdot n_2\\ &= |h_1|^2s_1 + h_1^*h_2s_2 + e^{-j\phi_1}\cdot h_1^*n_1 + |h_1|^2s_1 -\\ &\quad h_1^*h_2s_2 + h_1^*e^{-j\phi_3}\cdot n_2\\ &= 2\cdot(|h_1|^2s_1) + h_1^*e^{-j\phi_1}\cdot n_1 + h_1^*e^{-j\phi_3}\cdot n_2\end{aligned}$$

Similarly, the transmitted symbol for stream-2 is estimated as below:

$$\begin{aligned}\hat{s}_2 &= h_2^*(e^{-j\phi_2}\cdot r_1 + e^{-j\phi_4}r_2)\\ &= 2\cdot(|h_2|^2s_2) + h_2^*e^{-j\phi_2}\cdot n_1 + h_2^*e^{-j\phi_4}\cdot n_2\end{aligned}$$

It can be seen that each user completely removes interference attributable to the transmission of a data stream by the other user when $\Phi_4-\Phi_3=\pi$ radians.

It should be noted that both the transmitter and receiver can be modified to handle simultaneous transmission in the same time-frequency slots for any number of data streams, as already discussed in the foregoing detailed description sections.

It should be further noted that in order to facilitate the explanation of the cancellation principle of the present invention, it was assumed that repeated symbols are either in phase or phase shifted by π radians (out of phase by π radians). The cancellation principle of the present invention, however, can readily be extended to the case where an arbitrary phase shift is applied to the repeated symbols in order to control the amount of interference rejection desired under different conditions, e.g., to achieve a selected percentage of interference cancellation/removal≦100%.

While the method the present invention has been shown and described with reference to certain example embodiments thereof, it will be understood by those skilled in the art that various changes in form and details may be made therein without departing from the spirit and scope of the invention as defined by the appended claims. Accordingly, the scope of the invention is not to be limited by the above embodiments but by the claims and the equivalents thereof.

What is claimed is:

1. A method for transmitting data, comprising the steps of:

determining two sets of phase shifts indicative of a selected percentage of interference attenuation between signals transmitted by at least one pair of a plurality of transmitters;

transmitting, via the plurality of transmitters, a plurality of signals using a first set of the phase shifts in a first time-frequency slot, with each transmitter transmitting a corresponding signal using a corresponding phase shift from among the first set of the phase shifts; and providing said selected percentage of interference attenuation between at least one pair of transmitters by re-transmitting, via the plurality of transmitters, the plurality of signals using a second set of the phase shifts in a second time-frequency slot, with each transmitter transmitting a corresponding signal using a corresponding phase shift from among the second set of the phase shifts, with:

all of the phase shifts in one of the first set of the phase shifts and the second set of the phase shifts being equal, and in the remaining set of the phase shifts, at least one pair of the phase shifts used by said at least one pair of transmitters providing said attenuation differing by a selected number of radians.

2. The method of claim 1, with the selected number of radians being $\pi$ radians.

3. The method of claim 1, further comprising the step of repeating, by the plurality of transmitters, the transmissions of the plurality of signals in a sequence of time-frequency slots, with the first set of the phase shifts being used in each even numbered time-frequency slot, and the second set of the phase shifts being used in each odd numbered time-frequency slot.

4. A method transmitting data, the method comprising the steps of:

determining each of a first through a fourth phase shift indicative of a selected percentage of interference attenuation between signals transmitted by first and second transmitters;

the first transmitter transmitting a first signal using the first phase shift in a first time-frequency slot in accordance with a selected protocol;

the second transmitter transmitting a second signal using the second phase shift simultaneously with the transmission of the first signal by the first transmitter in the first time-frequency slot in accordance with the selected protocol;

the first transmitter transmitting the first signal using the third phase shift in a second time-frequency slot in accordance with the selected protocol; and the second transmitter transmitting the second signal using the fourth phase shift simultaneously with the transmission of the first signal by the first transmitter in the second time-frequency slot in accordance with the selected protocol, with:

both phase shifts in one of the pair of said first and said second phase shifts, and the pair of said third and said fourth phase shifts being equal;

in the remaining one of the pair of said first and said second phase shifts, and the pair of said third and said fourth phase shifts, the phase shifts differing by a selected number of radians.

5. The method of claim 4, with the selected number of radians being $\pi$ radians.

6. The method of claim 4, with the first phase shift, the second phase shift and the third phase shift being substantially equal to zero, and the fourth phase shift being substantially equal to $\pi$ radians.

7. The method of claim 4, with the first phase shift, the third phase shift and the fourth phase shift being substantially equal to zero, and the second phase shift being substantially equal to $\pi$ radians.

8. The method of claim 4, with the selected protocol being Orthogonal Frequency-Division Multiplexing.

9. The method of claim 4, further comprising the step of repeating the transmissions of the first and second signals in a sequence of time-frequency slots, with the first and second phase shifts being used in even numbered time-frequency slots, and the third and fourth phase shifts being used in odd numbered time-frequency slots.

10. The method of claim 4, further comprising the step of, when the channels through which the first signals and the second signals are transmitted change over different time-frequency slots, attenuating interference between the first transmitter and the second transmitter by scaling the second signal according to a selected scaling scheme based on the changing channel at the time of simultaneous transmissions of the first and second signals in either the first time-frequency slot of the second time-frequency slot.

11. The method of claim 4, with the re-transmissions of the first and second signals being scheduled by a receiver transmitting a non-acknowledgement signal to the first and second transmitters.

12. A method for transmitting data, the method comprising the steps of:

converting data into a plurality of data streams;

determining two sets of phase shifts indicative of a selected percentage of interference attenuation between at least one pair of the data streams;

the transmitter simultaneously transmitting the plurality of data streams via respective antennas from among a plurality of antennas using a first set of the phase shifts in a first time-frequency slot, with each phase shift in the first set of the phase shifts being used for one corresponding data stream; and the transmitter simultaneously transmitting the plurality of data streams via respective antennas using a second set of the phase shifts during each odd numbered time-frequency slot, with each phase shift in the second set of the phase shifts being used for the corresponding data stream, with:

all of the phase shifts in one of the first set of the phase shifts and the second set of the phase shifts being equal, and in the remaining set of the phase shifts, at lease one pair of the phase shifts used for said at least one pair of data streams providing said interference attenuation differing by a selected number of radians.

13. A wireless communication system, comprising:

a plurality of transmitters transmitting signals; and a receiver disposed to communicate with the plurality of transmitters by scheduling simultaneous transmissions from the plurality of transmitters using common time-frequency slots, assigning each phase shift in a first set of the phase shifts to each of the plurality of transmitters for respectively transmitting a corresponding signal in a first time-frequency slot, and providing a selected percentage of interference attenuation between at least one pair of transmitters by assigning each phase shift in a second set of the phase shifts to each of the plurality of transmitters for respectively transmitting the corresponding signal in a second time-frequency slot, with:

all of the phase shifts in one of the first set of the phase shifts and the second set of the phase shifts being equal, and in the remaining set of the phase shifts, at least one pair of the phase shifts used by said at least one pair of transmitters providing said attenuation differing by a selected number of radians.

14. The wireless communication system of claim 13, with the selected number of radians being π radians.

15. The wireless communication system of claim 13, with the receiving scheduling the transmitters to simultaneously repeat the transmissions of the corresponding signals in a sequence of time-frequency slots, with the first set of the phase shifts being used in each even numbered time-frequency slots, and the second set of the phase shifts being used in each odd numbered time-frequency slots.

16. The wireless communication system of claim 13, with, when channels through which data are transmitted change over different time-frequency slots, the receiver instructing a certain transmitter to scale the corresponding signal to be transmitted via the selected transmitter in accordance with a selected scaling scheme based on the changing channel at the time of simultaneous transmissions by the plurality of transmitters during the second time-frequency slot.

17. The wireless communication system of claim 13, with the plurality of transmitters repeat the simultaneous transmissions upon receiving a non-acknowledgement signal from the receiver.

18. The wireless communication system of claim 13, with the receiver comprising:

a equalization module that performs equalization on the received signals; and a signal recovery module that combines and recovers the received signals.

19. A transmitter for transmitting data, comprising:

at least one de-multiplexer converting data into a plurality of data streams to be transmitted via a plurality of antennas;

a phase shift determination unit for determining two sets of phase shifts to provide a selected percentage of interference attenuation between at least one pair of the data streams, with the number of the phase shifts in each set of the phase shifts being the number of data streams, a first set of the phase shifts being assigned to respective simultaneous transmissions of the plurality of data streams during a first time-frequency slot, a second set of the phase shifts being assigned to respective simultaneous transmissions of the data streams during a second time-frequency slot, with:

all of the phase shifts in one of the first set of the phase shifts and the second set of the phase shifts being equal, and in the remaining set of the phase shifts, at lease one pair of the phase shifts used for said at least one pair of data streams providing said interference attenuation differing by a selected number of radians.

20. The transmitter of claim 19, with the selected number of radians being π radians.

* * * * *